(12) United States Patent
Chen et al.

(10) Patent No.: US 9,071,135 B2
(45) Date of Patent: Jun. 30, 2015

(54) CONVERTING CONTROLLER FOR OVERCURRENT PROTECTION

(75) Inventors: Ji-Ming Chen, Wuxi (CN); Huan-Wen Chien, New Taipei (TW)

(73) Assignee: GREEN SOLUTION TECHNOLOGY CO., LTD., New Taipei (TW)

( * ) Notice: Subject to any disclaimer, the term of this patent is extended or adjusted under 35 U.S.C. 154(b) by 689 days.

(21) Appl. No.: 13/115,997

(22) Filed: May 26, 2011

(65) Prior Publication Data

US 2012/0062196 A1 Mar. 15, 2012

(30) Foreign Application Priority Data

Sep. 14, 2010 (CN) .......................... 2010 1 0285927

(51) Int. Cl.
*G05F 1/00* (2006.01)
*H02M 3/156* (2006.01)
*H02M 1/32* (2007.01)

(52) U.S. Cl.
CPC ............... *H02M 3/156* (2013.01); *H02M 1/32* (2013.01)

(58) Field of Classification Search
USPC .................. 323/234, 237, 273–277, 282–285
See application file for complete search history.

(56) References Cited

U.S. PATENT DOCUMENTS

| 5,331,230 | A | | 7/1994 | Ichihara | |
|---|---|---|---|---|---|
| 5,335,162 | A | * | 8/1994 | Martin-Lopez et al. | ......... 363/97 |
| 7,038,436 | B2 | | 5/2006 | Goto et al. | |
| 7,149,098 | B1 | * | 12/2006 | Chen | ........................... 363/56.09 |
| 8,570,020 | B2 | * | 10/2013 | Tang et al. | ..................... 323/285 |
| 2004/0263139 | A1 | * | 12/2004 | Goto et al. | ...................... 323/282 |
| 2008/0079405 | A1 | * | 4/2008 | Shimizu | ......................... 323/282 |
| 2008/0186014 | A1 | * | 8/2008 | Sutardja et al. | ............... 324/120 |
| 2009/0016083 | A1 | * | 1/2009 | Soldano et al. | .................. 363/20 |
| 2009/0212851 | A1 | * | 8/2009 | Yamashita et al. | ............. 327/538 |

FOREIGN PATENT DOCUMENTS

| CN | 101662223 A | 3/2010 |
|---|---|---|
| JP | 2007-325371 A | 12/2007 |
| TW | M252961 | 12/2004 |
| TW | I246821 | 1/2006 |
| TW | 200919897 | 5/2009 |

OTHER PUBLICATIONS

"Office Action of Taiwan Counterpart Application", issued on Apr. 1, 2014, p. 1-p. 6.

* cited by examiner

*Primary Examiner* — Jeffrey Gblende

(74) *Attorney, Agent, or Firm* — Jianq Chyun IP Office

(57) ABSTRACT

The present invention employs a pin of a controller to set an over current protection value and a time period respectively by means of time-division and/or voltage and current. Therefore, the cost of the controller is reduced due to reducing the amount of pins thereof. Furthermore, the time period is not only used to setting a constant on time, but also used to setting a constant off time and an operating frequency for different controlling mode.

14 Claims, 5 Drawing Sheets

CONVERTING CONTROLLER FOR OVERCURRENT PROTECTION

CROSS-REFERENCE TO RELATED APPLICATION

This application claims the priority benefit of China application serial no. 201010285927.6, filed Sep. 14, 2010. The entirety of the above-mentioned patent application is hereby incorporated by reference herein and made a part of this specification.

BACKGROUND OF THE INVENTION (1) Field of the Invention

The present invention relates to a converting controller. More particularly, the invention relates to a converting controller for setting an over current protection value and a time period by the same pin.

(2) Description of the Prior Art

FIG. 1 is a schematic circuit of a conventional buck converter. Referring to FIG. 1, the buck converter is adapted to convert an input voltage Vin into a stable output voltage Vout, which includes a controller 10, a transistor switch NM, a diode D, an inductance L, an output capacitance Co, and an output voltage detector VD. The output voltage detector VD detects the output voltage Vout to generate a voltage feedback signal Vfb. The controller 10 is a constant on time controller and determines whether to turn on the transistor switch NM according to the voltage feedback signal Vfb. When the output voltage Vout is lower than a predetermined voltage, the controller 10 turns on the transistor switch NM for a constant on time, such that the power from the input voltage Vin is transmitted to the inductance L and the output capacitance Co through the transistor switch NM. After the constant on time, the transistor switch NM is turned off, and then the current through the diode D flows to the inductance L, so as to release the energy stored in the inductance L to the output capacitance Co. In order to avoid the current flowing through the transistor switch NM is over high to damage the transistor switch NM or the inductance L, the controller 10 receives a current detecting signal Cse representing the current value flowing through the transistor switch NM, wherein the current detecting signal Cse is generated by the on-state resistance of the transistor switch NM. When the current flowing through the transistor switch NM is larger than an over current protection value, the controller 10 immediately turns off the transistor switch NM in the cycle period.

The controller 10 includes a feedback comparator 11, an on-time setting circuit 12, a driving logic judgment circuit 14, an over current comparator 15, and an over current setting circuit 16. The on-time setting circuit 12 is outside coupled to an on-time setting resistance Rton to set the on-time period through a pin of the controller 10. The over current setting circuit 16 is outside coupled to an over current setting resistance Rocs to set an over current protection reference signal OCREF through another pin of the controller 10. When the voltage feedback signal Vfb is lower than a reference voltage signal Vre, i.e., the output voltage Vout is lower than the predetermined voltage, the feedback comparator 11 outputs a feedback comparing signal Com to the on-time setting circuit 12. Then, the on-time setting circuit 12 generates an on-time signal Ton with constant pulse width, which is set by the on-time setting resistance Rton. When the driving logic judgment circuit 14 receives the on-time signal Ton, the transistor switch NM is turned on, such that the power from the input voltage Vin is transmitted to the output capacitance Co to raise the output voltage Cout. When the current detecting signal Cse is lower than the over current protection reference signal OCREF, the voltage drop crossing the transistor switch NM operates is over high due to the current flowing through the transistor switch NM being larger than the over current protection value. Then, the over current comparator 15 outputs an over current protection signal OCP to the driving logic judgment circuit 14, such that the driving logic judgment circuit 14 turns off the transistor switch NM to avoid the problem of over current. When the output voltage Vout is lower than the predetermined voltage next time, the driving logic judgment circuit 14 turns on the transistor switch NM again.

The controller 10 sets the over current protection value and the on-time period through the different pins to be applied to the different applied situation. However, the above method increases the number of the pins of the controller 10 and so causes higher cost.

SUMMARY OF THE INVENTION

In the foregoing related art, using the two different pins to set the over current protection value and the on-time period to bring about the cost for the controller. A pin of a controller in the present invention is used to set an over current protection value and a time period respectively by means of time-division and/or voltage and current. Therefore, the cost of the controller is reduced due to reducing the amount of pins thereof. Furthermore, the time period is not only used to set a constant on time, but also used to set a constant off time and an operating frequency for different controlling mode.

To accomplish the aforementioned and other objects, an exemplary embodiment of the invention provides a converting controller. The converting controller is adapted to control a converting circuit and convert an input voltage into an output voltage, wherein, the converting circuit comprises a transistor switch coupled to the input voltage. The converting controller comprises an over current setting unit, a time setting unit, and a controlling unit. The over current setting unit is coupled to a setting circuit through a setting pin for generating an over current setting signal representing an over current value according to a voltage value of the setting circuit. The time setting unit is coupled to the setting circuit through the setting pin for generating a time period setting signal representing a time period according to a current value of the setting circuit. The controlling unit receives the time period setting signal and the over current setting signal. Besides, the controlling unit receives a feedback signal representing the state of the converting circuit for switching the transistor switch according to the feedback signal and the time period setting signal. Moreover, the controlling unit receives a current detecting signal representing the current value flowing through the transistor switch for determining whether to turn off the transistor switch according to the current detecting signal and the over current setting signal, such that the current of the transistor switch is maintained within the over current value.

Furthermore, another exemplary embodiment of the invention provides a converting controller. The converting controller is adapted to control a converting circuit and convert an input voltage into an output voltage, wherein, the converting circuit comprises a transistor switch which is coupled to the input voltage. The converting controller comprises an over current setting unit, a time setting unit, and a controlling unit. The over current setting unit is coupled to a setting circuit through a setting pin and receives a first signal of the setting circuit during a first time period to generate an over current setting signal representing an over current value. The time setting unit is coupled to the setting circuit through the setting pin and receives a second signal of the setting circuit during a second time period to generate a time period setting signal representing a time period. The controlling unit receives the time period setting signal and the over current setting signal. Besides, the controlling unit receives a feedback signal representing the state of the converting circuit for switching the transistor switch according to the feedback signal and the time period setting signal. Moreover, the controlling unit receives a current detecting signal representing the current value flowing through the transistor switch for determining whether to turn off the transistor switch according to the current detecting signal and the over current setting signal, such that the current of the transistor switch is maintained within the over current value. Wherein, the first time period and the second time period are staggered with each other.

It is to be understood that both the foregoing general description and the following detailed description are exemplary, and are intended to provide further explanation of the invention as claimed. In order to make the features and the advantages of the invention comprehensible, exemplary embodiments accompanied with figures are described in detail below.

BRIEF DESCRIPTION OF THE DRAWINGS

The present invention will now be specified with reference to its preferred embodiment illustrated in the drawings, in which.

DESCRIPTION OF THE PREFERRED EMBODIMENT

Figure 1:
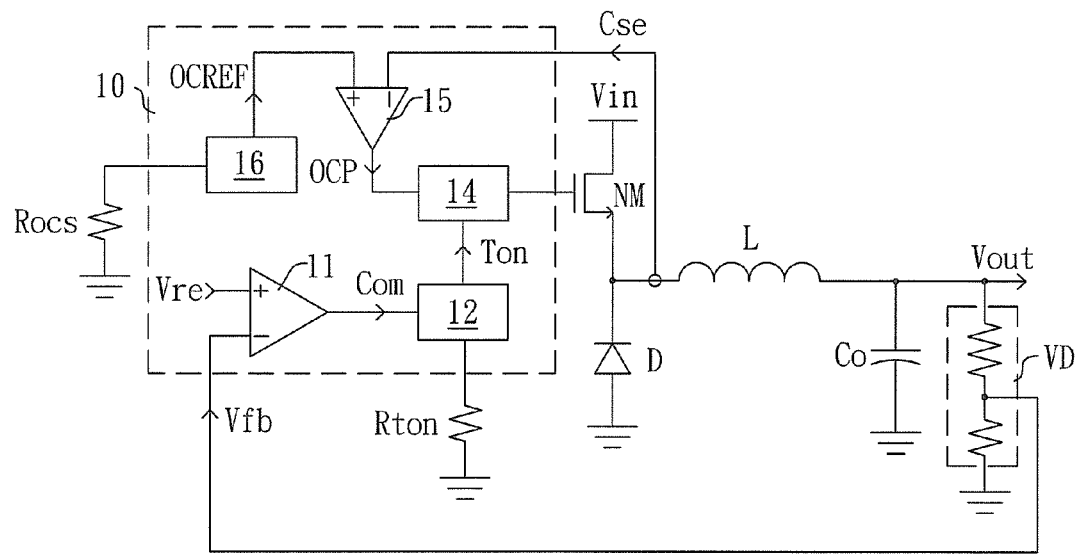
FIG. 1 is a schematic circuit of a conventional buck converter.
Figure 2:
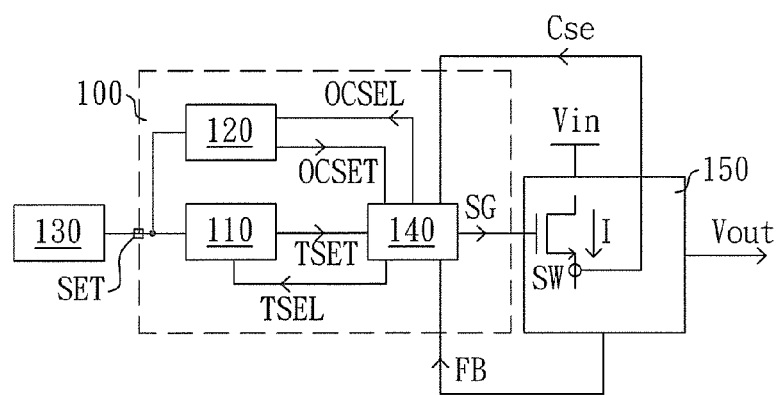
FIG. 2 is a schematic diagram of a power converting circuit of the converting controller according to the invention.

FIG. 2 is a schematic diagram of a power converting circuit of the converting controller according to the invention. Referring to FIG. 2, the power converting circuit comprises a converting controller 100 and a converting circuit 150. The converting circuit 150 converts an input voltage Vin into an output voltage Vout to provide a proper driving voltage or driving current to drive a load (not shown). Wherein, the converting circuit 150 includes a transistor switch SW coupled to the input voltage Vin. The converting controller 100 receives a feedback signal FB representing the voltage or current output by the converting circuit 150, so as to generate a control signal SG according to the feedback signal FB to control the transistor switch SW to be turned on or turned off and then provide the proper and stable driving voltage or driving current. Beside from that, in order to avoid the current I flowing through the transistor switch SW is too large, the converting controller 100 receives a current detecting signal Cse representing the current I flowing through the transistor switch SW. When the current I is higher than a predetermined over current value, the converting controller 100 turns the transistor switch SW off, such that the current I is maintained within the over current value.

The converting controller 100 includes a time setting unit 110, an over current setting unit 120, and a controlling unit 140. The time setting unit 110 is outside coupled to a setting circuit 130 through a setting pin SET to set a time period and generate a time period setting signal TSET correspondingly. The over current setting unit 120 is also outside coupled to the above setting circuit 130 through the same setting pin SET to set an over current value and generates an over current setting signal OCSET correspondingly. The controlling unit 140 receives the time period setting signal TSET and the feedback signal FB to generate the control signal SG accordingly, so as to control the transistor switch SW be turned on or turned off and so the converting circuit 150 could provide the stable driving voltage or driving current.

The time setting unit 110 and the over current setting unit 120 separately set the degrees of the time period and the over current value through the external setting circuit 130. Due to the time period and the over current value need to be set independently, the present invention sets the time period and the over current value separately according to the different electric characteristics of the setting circuit 130, e.g., the voltage, the current, or the resistance value, etc. In order to avoid the measurement result may be influenced if simultaneously measuring different electric characteristics of the setting circuit 130. A method of time-division measurement may be used in the present invention, such that the time period and the over current value are set during the different period. For example, in the embodiment as shown in FIG. 2, the controlling unit 140 generates a over current setting timing signal OCSEL and a time setting timing signal TSEL to the over current setting unit 120 and the time setting unit 110. The over current setting timing signal OCSEL represents a first time period and the time setting timing signal TSEL represents a second time period. The first time period and the second time period are staggered. Alternatively, the over current setting unit 120 and the time setting unit 110 can also be notified with each other to make sure that both of the set timing are non-overlapping. The above of these could be replaced by others forms which are described in the following embodiments.

Figure 3:
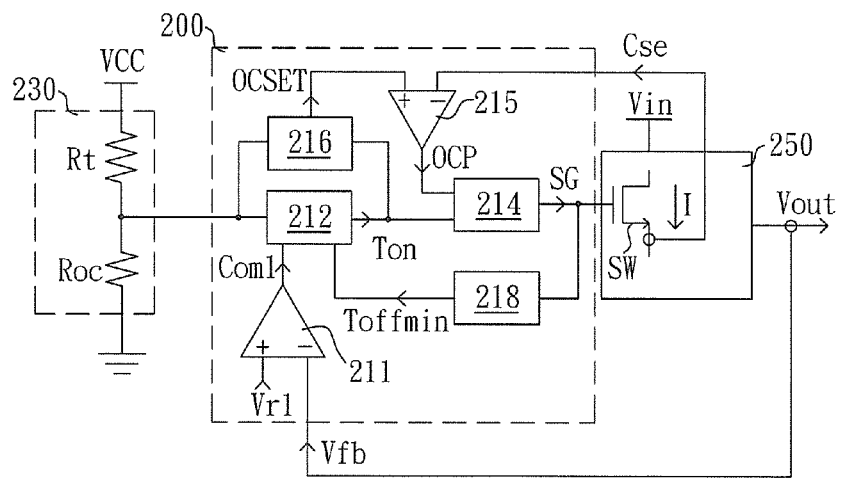
FIG. 3 is a schematic diagram of a power converting circuit according to a first embodiment of the invention.

FIG. 3 is a schematic diagram of a power converting circuit according to a first embodiment of the invention. Referring to FIG. 3, the power converting circuit includes a converting controller 200, a setting circuit 230, and a converting circuit 250. Wherein, the converting controller 200 is a constant on time controller. The converting controller 200 generates a control signal SG to control a transistor switch SW of the converting circuit 250. The transistor switch SW is coupled to an input voltage Vin to control the amount of power transmitted from the input voltage Vin to the output voltage Vout, such that the output voltage Vout is stabilized at a predetermined voltage value. The setting circuit 230 is a voltage divider, includes a time setting resistance Rt and an over current setting resistance Roc connected in series. A terminal of the setting circuit 230 is coupled to a driving power VCC and another terminal thereof is ground. The voltage-dividing connecting point of the voltage divider is coupled to the converting controller 200.

The converting controller 200 includes a feedback comparator 211, a time setting unit 212, a controlling circuit 214, an over current comparator 215, an over current setting unit 216, and a minimum cut-off time unit 218. The feedback comparator 211 receives a voltage feedback signal Vfb representing the output voltage Vout and a first voltage reference signal Vr1. When the level of the voltage feedback signal is lower than that of the first voltage reference signal Vr1 (i.e., the output voltage Vout is lower than the predetermined voltage value), the feedback comparator 211 outputs a feedback comparing signal Com1. The time setting unit 212 is coupled to the voltage-dividing connecting point of the voltage divider of the setting circuit 230 to set a time period according to a current signal of the setting circuit 230 and generates a time period setting signal Ton representing the time period. In the present embodiment, the time period set by the time setting unit 212 according to the setting circuit 230 is a constant on time, such that when the controlling circuit 214 receives the time period setting signal Ton, the control signal SG is generated to turn the transistor switch SW on for the time period. After that time period, the control signal SG becomes low level, and so the transistor switch SW is turned off. The minimum cut-off time unit 218 is a falling edge triggered circuit. When the minimum cut-off time unit 218 detects the control signal SG from high level to low level, a pulse signal Toffmin with constant pulse width is generated to the time setting unit 212. Therefore, the time period setting signal Ton is forbidden to generate when the time setting unit 212 receives the pulse signal Toffmin. Thus, the stored power of the converting circuit 250 during the turned-on period of the transistor switch could be released, so as to avoid the stored power exceeding the maximum store capacity of the converting circuit 250.

The over current setting unit 216 is coupled to the voltage-dividing connecting point of the setting circuit 230 to set an over current value according to a voltage signal of the setting circuit 230. The over current setting unit 216 is also coupled to the time setting unit 212 to receive the time period setting signal Ton and samples the voltage of the setting circuit 230 when the time setting unit 212 stops generating the time period setting signal Ton, so as to generate an over current setting signal OCSET representing the over current value. When the time setting unit 212 generates the time period setting signal Ton, the transistor switch SW is turned on and a current I flows through the transistor switch SW and a current detecting signal Cse, representing the amount of the current I, is generated by the on-state resistance of the transistor switch SW. The over current comparator 215 receives the over current setting signal OCSET and the current detecting signal Cse. When the current I is judged to reach the over current value, the over current comparator 215 generates an over current protection signal OCP to the controlling circuit 214, such that the controlling circuit 214 stops generating the control signal SG to ensure that the current I is maintained within the over current value.

Figure 4:
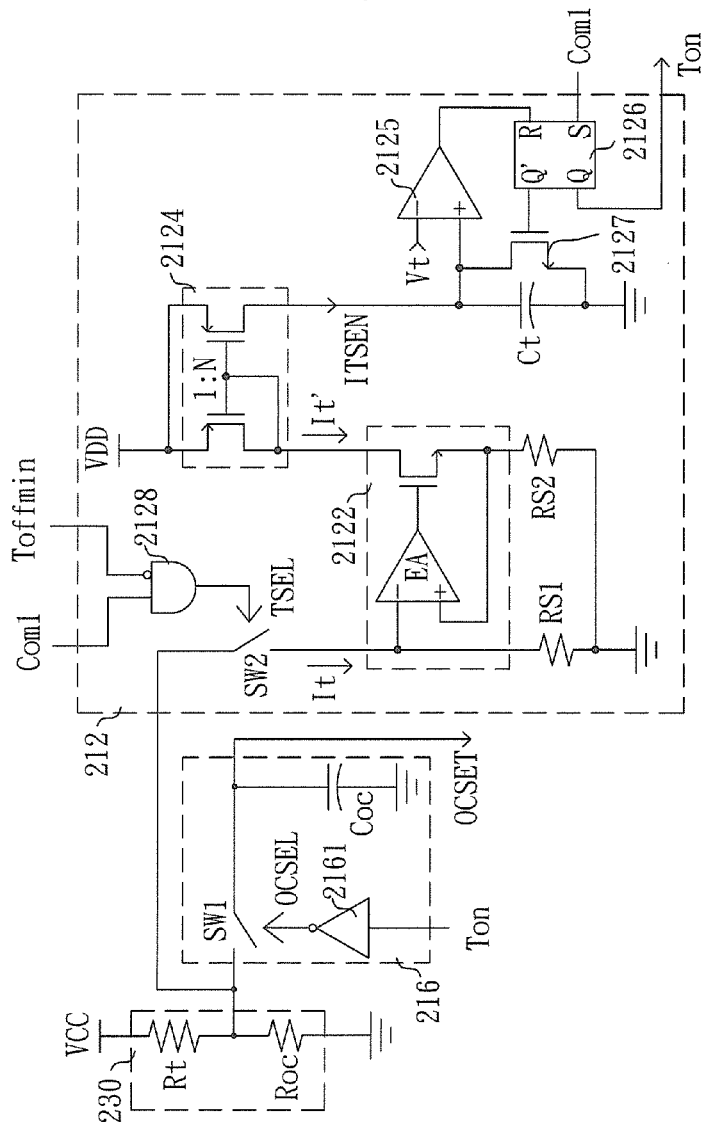
FIG. 4 is a schematic circuit of a time setting unit and an over current setting unit according to the first embodiment of the invention shown in FIG. 3.

FIG. 4 is a schematic circuit of a time setting unit and an over current setting unit according to the first embodiment of the invention shown in FIG. 3. The over current setting unit 216 includes a first timing switch SW1, an over current setting capacitance Coc, and an inverter 2161. The time setting unit 212 includes a second timing switch SW2, a first setting resistance RS1, a second setting resistance RS2, a voltage follower 2122, a current mirror 2124, a comparator 2125, a SR latch 2126, a discharge switch 2127, a AND gate 2128, and a time setting capacitance Ct. The AND gate 2128 receives the feedback comparing signal Com1 and the inverted pulse signal Toffmin. When the feedback comparing signal Com1 is high level and the pulse signal Toffmin is low level, i.e., the output voltage Vout is lower than a predetermined voltage value and is not during the period for releasing the stored power of the converting circuit 250, the AND gate 2128 outputs high level of the time setting timing signal TSEL to turn the second timing switch SW2 on. At this moment, the driving power VCC is coupled to the over current setting resistance Roc and the first setting resistance RS1 in parallel through the time setting resistance Rt to ground. Therefore, the setting circuit 230 provides a current flowing through the first setting resistance RS1 to form a voltage drop across there. The voltage drop is duplicated into the second setting resistance RS2 through the voltage follower 2122, such that a current It' flows through the second setting resistance RS2. The ratio of the current It' to the current It and the ratio of the second setting resistance RS2 to the first setting resistance RS1 are in inverse proportion. The current mirror 2124 is coupled to a voltage VDD and mirrors the current It' to generate a current ITSEN, so as to charge the time setting capacitance Ct. The current It could be scaled up or down to be the current ITSEN through ratio set of the second setting resistance RS2 to the first setting resistance RS1 ratio and the current mirror 2124. Therefore, the time setting unit 212 is capable of setting the time period with a larger range.

A set terminal S of the SR latch 2126 receives the feedback comparing signal Com1. When the feedback comparing signal Com1 is high level, the output terminal Q of the SR latch 2126 outputs the time period setting signal Ton to high level immediately. The comparator 2125 is coupled to the time setting capacitance Ct to compare the voltage of the time setting capacitance Ct with a voltage reference signal Vt. When the voltage of the time setting capacitance Ct charged with the current ITSEN is raised to the voltage reference signal Vt, the comparator 2125 generates an output signal to high level to a reset terminal R of the SR latch 2126. The time period setting signal Ton is turned to be low level and an inverse output terminal Q' of the SR latch 2126 is outputted a signal with high level to turn the discharge switch 2127 on. Such that the stored power in the time setting capacitance Ct is released down and the voltage of the time setting capacitance Ct is zero volt until the next cycle period. The time period representing the time period setting signal Ton is determined according to the value of the current ITSEN and the value of the time setting capacitance Ct. The value of the current ITSEN is determined according to the voltage drop of the first setting resistance RS1. Therefore, the voltage drop of the first setting resistance RS1 could be modulated by adjusting the resistance of the time setting resistance Rt and so the time period is also modulated simultaneously.

The inverter 2161 of the over current setting unit 216 receives the time period setting signal Ton and reverses the time period setting signal Ton as the over current setting timing signal OCSEL, so as to control the first timing switch SW1. The on-time of the first timing switch SW1 and the second timing switch SW2 are staggered. When the time period setting signal Ton is low level, the inverter 2161 generates the over current setting timing signal OCSEL to turn the first timing switch SW1 on. At this moment, the over current setting capacitance Coc samples the voltage of the voltage-dividing connecting point of the setting circuit 230 to generate the over current setting signal OCSET. When the time period setting signal Ton is high level, the inverter 2161 cut off the first timing switch SW1, such that the over current setting capacitance Coc maintains the sampled level of the over current setting signal OCSET. The voltage of the voltage-dividing connecting point of the setting circuit 230 is determined according to the ratio of the time setting resistance Rt to the over current setting resistance Roc. Therefore, by adjusting the ratio of the time setting resistance Rt to the over current setting resistance Roc, the over current setting signal OCSET could be modulated to properly set an over current value.

Figure 5:
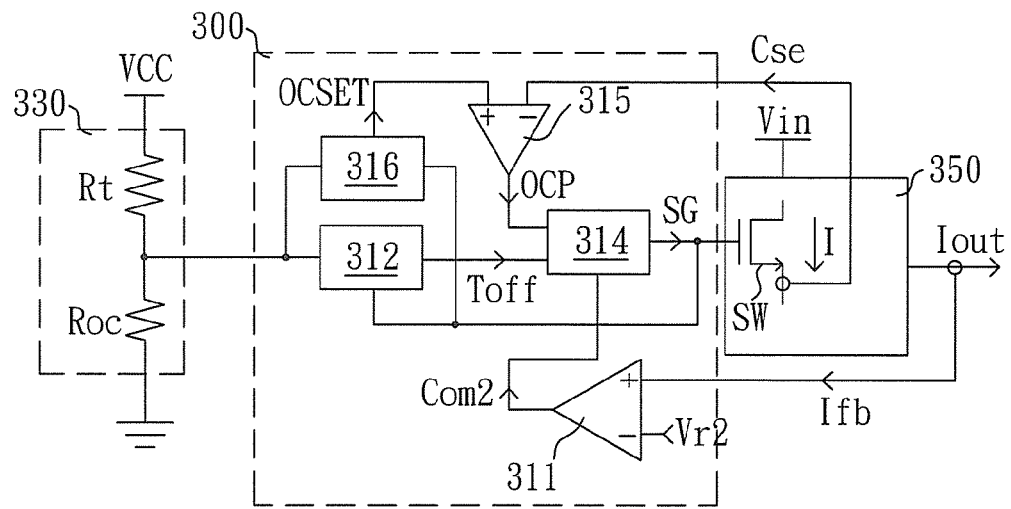
FIG. 5 is a schematic diagram of a power converting circuit according to a second embodiment of the invention.

FIG. 5 is a schematic diagram of a power converting circuit according to a second embodiment of the invention. Referring to FIG. 5, the power converting circuit includes a converting controller 300, a setting circuit 330, and a converting circuit 350. Wherein, the converting controller 300 is a constant on time controller. The converting controller 300 generates a control signal SG to control the transistor switch SW in the converting circuit 350. The transistor switch SW is coupled to an input voltage Vin to control the amount of the output current Iout, such that the output current Iout is stabilized at a predetermined current value. The setting circuit 330 is a voltage divider, includes a time setting resistance Rt and an over current setting resistance Roc connected in series. A terminal of the setting circuit 330 is coupled to a driving power VCC and another terminal thereof is ground. The voltage-dividing connecting point of the voltage divider is coupled to the converting controller 300.

The converting controller 300 includes a feedback differential amplifier 311, a time setting unit 312, a controlling circuit 314, an over current comparator 315, and an over current setting unit 316. The feedback differential amplifier 311 receives a current feedback signal Ifb representing the output current Tout and a second voltage reference signal Vr2 to output a feedback differential amplifier signal Com2. The time setting unit 312 is coupled to the voltage-dividing connecting point of the setting circuit 330 to set a time period according to a current signal of the setting circuit 330. The time setting unit 312 is coupled to the controlling circuit 314. When the control signal SG is at low level, a time period setting signal Toff representing the time period is generated. In the present embodiment, the time period which is the time setting unit 312 set by setting circuit 330 is a constant off time. Thus, when the controlling circuit 314 receives the time period setting signal Toff, the control signal SG is at low level continuously for the time period. After the time period, the controlling circuit 314 outputs the control signal SG with high level, such that the transistor switch SW is turned on again. Alternatively, if the controlling circuit 314 determines the output current Iout is lower than a predetermined low current according to the feedback differential amplifier signal Com2, the high level of the control signal SG is generated immediately to turn on the transistor switch SW regardless of the time period setting signal Toff, so as to maintain the output current Tout above the predetermined low current. When the controlling circuit 314 determines the output current Iout is higher than a predetermined high current value according to the feedback differential amplifier signal Com2, the control signal SG is turned to low level to turn off the transistor switch SW.

The over current setting unit 316 is coupled to the voltage-dividing connecting point of the setting circuit 330 to set an over current value according to a voltage signal of the setting circuit 330. When the over current setting unit 316 receives the control signal SG being high level, the over current setting unit 316 detects the voltage signal of the setting circuit 330 and generates an over current setting signal OCSET representing the over current value. When the controlling circuit 314 turns the transistor switch SW on, a current I flows through the transistor switch SW and a current detecting signal Cse representing the current value I is generated by the on-state resistance of the transistor switch SW. The over current comparator 315 receives the over current setting signal OCSET and the current detecting signal Cse. When the current I reaches the over current value, the over current comparator 315 generates an over current protection signal OCP to the controlling circuit 314, such that the control signal SG becomes to low level to turn the transistor switch SW off for ensuring the current I is maintained lower than the over current value.

Figure 6:
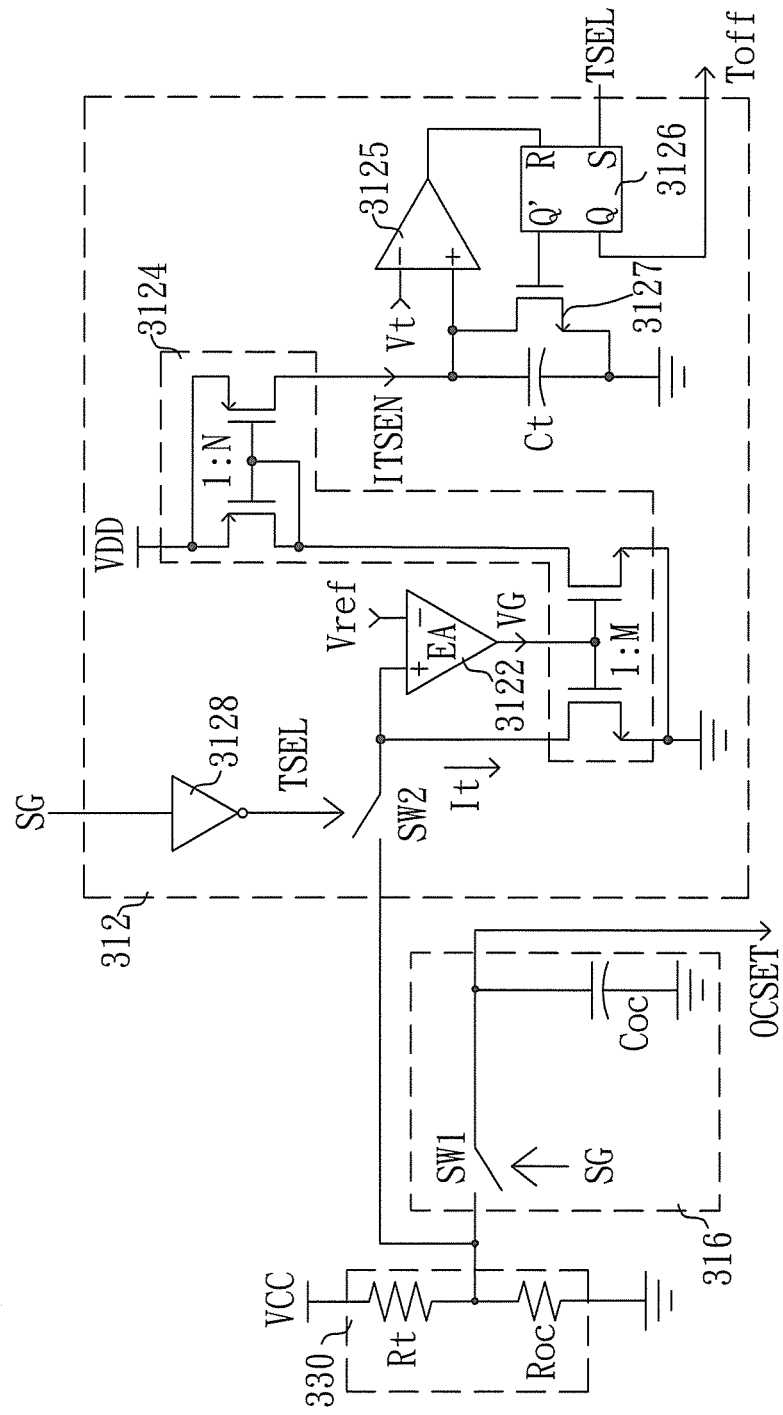
FIG. 6 is a schematic circuit of a time setting unit and an over setting unit according to the second embodiment of the invention shown in FIG. 5.

FIG. 6 is a schematic circuit of a time setting unit and an over setting unit according to the second embodiment of the invention shown in FIG. 5. Referring to FIG. 6, the over current setting unit 316 includes a first timing switch SW1. The time setting unit 312 includes a second timing switch SW2, a error amplifier 3122, a current mirror 3124, a comparator 3125, a SR latch 3126, a discharge switch 3127, a inverter 3128, and a time setting capacitance Ct. When the control signal SG is at low level, the time setting timing signal TSEL is at high level by the inverter 3128 reversing the control signal SG, so as to turn the second timing switch SW2 on. The error amplifier 3122 compares with the level of the voltage-dividing connecting point of the setting circuit 330 and a reference voltage Vref, and outputs a gate control signal VG to control the equivalent impedance of the transistor of the current mirror 3124, such that the level of the voltage-dividing connecting point of the voltage divider of the setting circuit 330 is equal to the reference voltage Vref. Hence, the current It is equal to (the voltage of the driving power VCC− the reference voltage Vref)/the impedance of the time setting resistance Rt. The current mirror 3124 generates the current ITSEN according to the current It to charge the time setting capacitance Ct. Accordingly, the time period of charging the time setting capacitance Ct to reach the level of the voltage reference signal Vt could be modulated by adjusting the time setting resistance Rt.

A set terminal S of the SR latch 3126 receives the time setting timing signal TSEL. When the time setting timing signal TSEL is at high level, the output terminal Q of the SR latch 3126 immediately outputs the time period setting signal Toff to high level. The comparator 3125 is coupled to the time setting capacitance Ct to compare the voltage of the time setting capacitance Ct with a voltage reference signal Vt. When the voltage of the time setting capacitance Ct charged by the current ITSEN is raised to the voltage reference signal Vt, the comparator 3125 generates a high level output signal to a reset terminal R of the SR latch 3126. The time period setting signal Toff is turned to low level and an inverse output terminal Q' of the SR latch 3126 outputs a high level signal to turns the discharge switch 3127 on. Such that the charges stored in the time setting capacitance Ct is released down to make the across voltage thereof be zero volt until next cycle period.

When the control signal SG is at high level, the first timing switch SW1 is turned on. At this moment, the over current setting capacitance Coc samples the voltage of the voltage-dividing connecting point of the setting circuit 330 to generate the over current setting signal OCSET. Through the filter function of the over current setting capacitance Coc, the over current setting signal OCSET is maintained a stable level to avoid the noise interference in the circuit. The voltage of the voltage-dividing connecting point of the setting circuit 330 is determined by the proportion of the time setting resistance Rt to the over current setting resistance Roc. Therefore, the over current setting signal OCSET could be modulated to set different over current value by adjusting the proportion of the time setting resistance Rt to the over current setting resistance Roc. The second timing switch SW2 is switched according to the reversed control signal SG and the first timing switch SW1 is switched according to the control signal SG directly.

Therefore, the on-time of the first timing switch SW1 and the second timing switch SW2 are staggered.

Figure 7:
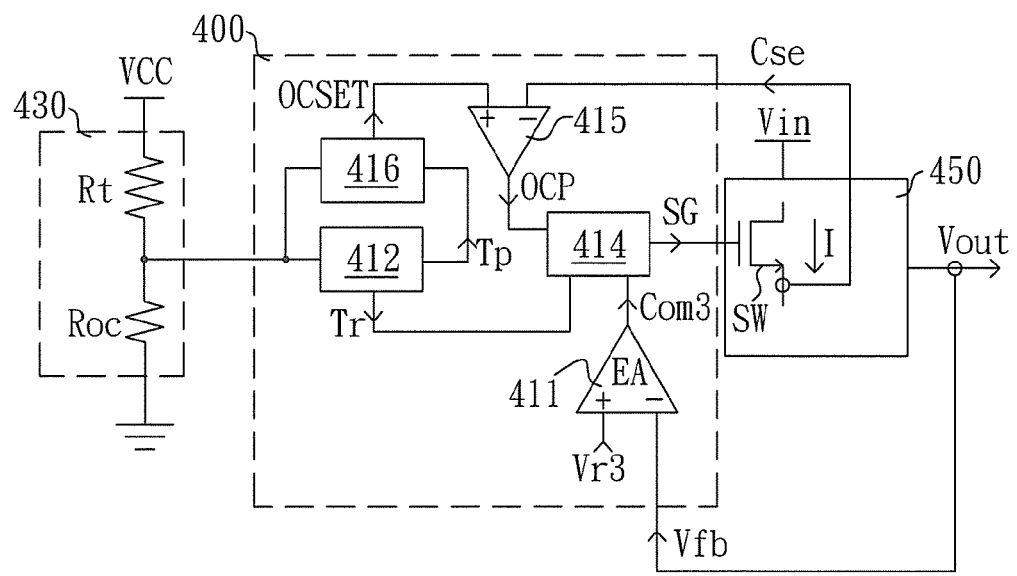
FIG. 7 is a schematic diagram of a power converting circuit according to a third embodiment of the invention.

FIG. 7 is a schematic diagram of a power converting circuit according to a third embodiment of the invention. Referring to the FIG. 7, the power converting circuit includes a converting controller 400, a setting circuit 430, and a converting circuit 450. Wherein, the converting controller 400 is a fixed frequency controller. The converting controller 400 generates a control signal SG to control the transistor switch SW in the converting circuit 450. The transistor switch SW is coupled to an input voltage Vin to control the power transmitted from the input voltage Vin to the output voltage Vout, such that the output voltage Vout is stabilized at a predetermined voltage value. The setting circuit 430 is a voltage divider, includes a time setting resistance Rt and an over current setting resistance Roc connected in series. A terminal of the setting circuit 430 is coupled to a driving power VCC and another of terminal thereof is ground. The voltage-dividing connecting point of the voltage divider is coupled to the converting controller 400.

The converting controller 400 include a feedback error amplifier 411, a time setting unit 412, a controlling circuit 414, an over current comparator 415, and an over setting unit 416. The feedback error amplifier 411 receives a voltage feedback signal Vfb representing the output voltage Vout and a third voltage reference signal Vr3 to generate a feedback error amplifier signal Com3. The time setting unit 412 is coupled to the voltage-dividing connecting point of the voltage divider of the setting circuit 430 to modulate a time period according to a voltage signal of the setting circuit 430 and generates a time period setting signal Tr representing the time period and a corresponding pulse signal Tp. Wherein, the time period setting signal Tr is a ramp signal. In the present embodiment, the operation period of the time setting unit 412 is determined according to the time period set by setting circuit 430 and is a constant, i.e., the time period setting signal Tr and the pulse signal Tp is a fixed-frequency signal. The controlling circuit 414 modulates the duty cycle of the control signal SG according to the time period setting signal Tr and the feedback error amplifier signal Com3, such that the output voltage Vout is stabilized at the predetermined voltage value.

The over current setting unit 416 is coupled to the voltage-dividing connecting point of the voltage divider of the setting circuit 430 to set an over current value according to a current signal of the setting circuit 430. The over current setting unit 416 is also coupled to the time setting unit 412 to receive the pulse signal Tp. When the pulse signal Tp is low level, the setting circuit 430 samples the current of the setting circuit 430, so as to generate the over current setting signal OCSET representing the over current value. The controlling circuit 414 turns the transistor switch SW on and a current I flow there through. A current detecting signal Cse is generated by the on-state resistance of the transistor switch SW. The over current comparator 415 receives the over current setting signal OCSET and the current detecting signal Cse. When the current I reaches the over current value, the over current comparator 415 generates an over current protection signal OCP to the controlling circuit 414, such that the controlling circuit 414 stops generating the control signal SG to ensure that the current I is maintained within the over current value.

Figure 8:
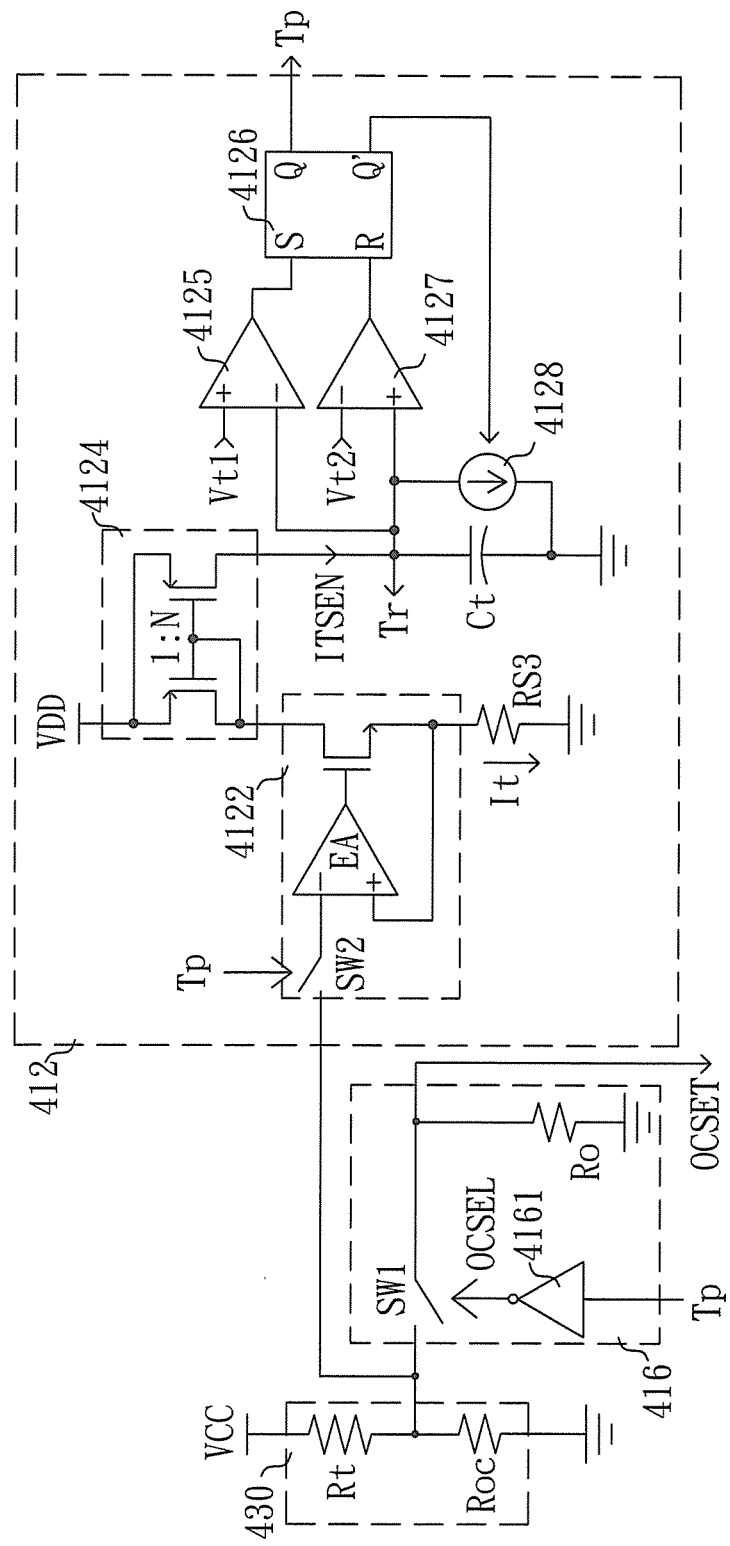
FIG. 8 is a schematic circuit of a time setting unit and an over setting unit according to the third embodiment of the invention shown in FIG. 7.

FIG. 8 is a schematic circuit of a time setting unit and an over setting unit according to the third embodiment of the invention shown in FIG. 7. Referring to FIG. 8, the over current setting unit 416 includes a first timing switch SW1, an over current setting resistance Roc, and an inverter 4161. The time setting unit 412 includes a second timing switch SW2, a third setting resistance RS3, a voltage follower 4122, a current mirror 4124, a first comparator 4125, a SR latch 4126, a second comparator 4127, a discharge current source 4128, and a time setting capacitance Ct. When the voltage of the time setting capacitance Ct is decreased to lower than a first reference voltage Vt1, the first comparator 4125 generates a high level signal to a set terminal S of the SR latch 4126, such that the output terminal Q of the SR latch 4126 outputs the pulse signal Tp with high level and then the second timing switch SW2 is turned on. At this moment, the voltage follower 4122 controls the voltage drop of the third setting resistance RS3 according to the level of the voltage-dividing connecting point of the setting circuit 430, such that the voltage drop of the third setting resistance RS3 is equal to the level of the voltage-dividing connecting point of the setting circuit 430. A current flowing through the third setting resistance RS3 is mirrored by the current mirror 4124 to generate a current ITSEN, so as to charge the time setting capacitance Ct. The different current ITSEN could be modulated by adjusting the ratio of the time setting resistance Rt to the over current setting resistance Roc. Hence, the converting controller 400 is capable of modulating operating frequency.

When the time setting capacitance Ct is charged to reach the second reference voltage Vt2, the second comparator 4127 generates a high level signal to a reset terminal R of the SR latch 4126, such that the output terminal Q of the SR latch 4126 outputs the pulse signal Tp with low level. At this moment, the inverse output terminal Q' of the SR latch 2126 outputs a high level signal to start the discharge current source 4128. Such that the charged stored in the time setting capacitance Ct is discharged until that the voltage of the time setting capacitance Ct is lower than the first reference voltage Vt1. Therefore, the time period setting signal Tr is a ramp signal generated by the time setting capacitance Ct, as a reference signal for generating the control signal SG.

The inverter 4161 receives the pulse signal Tp and outputs the over current setting timing signal OCSEL by reversing the pulse signal Tp, so as to switch the first timing switch SW1. Therefore, the on-time of the first timing switch SW1 and the second timing switch SW2 are staggered.

When the pulse signal Tp is at low level, the inverter 4161 generates the over current setting timing signal OCSEL being high level to turn the first timing switch SW1 on. At this moment, the setting circuit 430 provides a current flowing through the over current setting resistance Ro to generate an over current setting signal OCSET. The voltage of the voltage-dividing connecting point of the voltage divider of the setting circuit 430 is determined according to the ratio of the time setting resistance Rt to the equivalent resistance of the over current setting resistance Ro and Roc connected in parallel. Accordingly, the level of the over current setting timing signal OCSEL could be modulated by adjusting the ratio of the time setting resistance Rt to the over current setting resistance Roc.

According to the above embodiment, a pin of a controller in the present invention is used to set an over current protection value and a time period respectively by means of time-division and/or voltage and current. Therefore, the cost of the controller is reduced due to reducing the amount of pins thereof. Furthermore, the time period is not only used to setting a constant on time, but also used to setting a constant off time or an operating frequency for different controlling mode.

As the above description, the invention completely complies with the patentability requirements: novelty, non-obviousness, and utility. It will be apparent to those skilled in the art that various modifications and variations can be made to the structure of the invention without departing from the scope or spirit of the invention. In view of the foregoing descriptions, it is intended that the invention covers modifications and variations of this invention if they fall within the scope of the following claims and their equivalents.

What is claimed is:

1. A converting controller, adapted to control a converting circuit and convert an input voltage into an output voltage, wherein, the converting circuit comprising a transistor switch coupled to the input voltage, the converting controller comprising:
    an over current setting unit, coupled to a setting circuit through a setting pin for generating an over current setting signal representing an over current value according to a voltage value of the setting circuit, wherein the over current setting signal is independent of the output voltage;
    a time setting unit, coupled to the setting circuit through the setting pin for generating a time period setting signal representing a time period according to a current value of the setting circuit; and
    a controlling unit, receiving the time period setting signal, and a feedback signal representing a state of the converting circuit to accordingly switch the transistor switch, and receiving the over current setting signal and a current detecting signal representing a current value flowing through the transistor switch to accordingly determine whether to turn off the transistor switch to have a current of the transistor switch being maintained within the over current value,
    wherein the over current setting unit and the time setting unit are coupled to the setting circuit through the setting pin,
    wherein the over current setting unit comprises a first timing switch and the controlling unit turns on the first timing switch during a first time period, such that the over current setting unit generates the over current setting signal according to a voltage of the setting pin.

2. The converting controller according to claim 1, wherein the current detecting signal is generated by an on-state resistance of the transistor switch.

3. The converting controller according to claim 2, wherein the converting controller is a constant on time controller and a constant on time is determined according to the time period setting signal or a constant off time controller and a constant off time is determined according to the time period setting signal.

4. The converting controller according to claim 3, wherein the setting circuit comprises a voltage divider and a voltage-dividing connecting point of the voltage divider is coupled to the setting pin.

5. The converting controller according to claim 1, wherein the over current setting unit comprises a sampling hold circuit and samples a voltage of the voltage-dividing connecting point of the voltage divider during the first time period.

6. The converting controller according to claim 1, wherein the time setting unit comprises a second timing switch and the controlling unit turns on the second timing switch during a second time period, such that the time setting unit generates the time period setting signal according to a current flowing through the voltage divider, wherein the first time period and the second time period are staggered.

7. The converting controller according to claim 2, wherein the converting controller operates at a constant frequency that is determined according to the time period setting signal.

8. A converting controller, adapted to control a converting circuit and convert an input voltage into an output voltage, wherein, the converting circuit comprising a transistor switch coupled to the input voltage, the converting controller comprising:
    an over current setting unit, coupled to a setting circuit through a setting pin and receiving a first signal of the setting circuit during a first time period to generate an over current setting signal representing an over current value;
    a time setting unit, coupled to the setting circuit through the setting pin and receiving a second signal of the setting circuit during a second time period to generate a time period setting signal representing a time period; and
    a controlling unit, receiving the time period setting signal, and a feedback signal representing a state of the converting circuit to accordingly switch the transistor switch, and receiving the over current setting signal and a current detecting signal representing a current value flowing through the transistor switch to accordingly determine whether to turn off the transistor switch to have a current of the transistor switch being maintained within the over current value;
    wherein, the first time period and the second time period are staggered with each other,
    wherein the first signal and the second signal are independent of the output voltage,
    wherein the over current setting unit and the time setting unit are coupled to the setting circuit through the setting pin, and
    wherein the over current setting unit comprises a first timing switch and the controlling unit turns on the first timing switch during the first time period, such that the over current setting unit generates the over current setting signal according to a voltage of the setting pin.

9. The converting controller according to claim 8, wherein the current detecting signal is generated by an on-state resistance of the transistor switch.

10. The converting controller according to claim 9, wherein the over current setting unit comprises a sampling hold circuit and samples a level of the first signal during the first time period.

11. The converting controller according to claim 10, wherein the over current setting unit comprises an over current setting capacitor, the first timing switch is turned on during the first time period, such that the over current setting capacitor samples the level of the first signal.

12. The converting controller according to claim 9, wherein the converting controller is a constant on time controller and a constant on time is determined according to the time period setting signal or a constant off time controller and a constant off time is determined according to the time period setting signal.

13. The converting controller according to claim 9, wherein the setting circuit comprises a voltage divider and a voltage-dividing connecting point of the voltage divider is coupled to the setting pin.

14. The converting controller according to claim 9, wherein the converting controller operates at a constant frequency that is determined according to the time period setting signal.

* * * * *